3,081,492
POTTING MECHANISM
Daniel E. Grzegorczyk, Milwaukee, Wis., assignor to General Motors Corporation, Detroit, Mich., a corporation of Delaware
Filed Dec. 16, 1960, Ser. No. 76,334
4 Claims. (Cl. 18—30)

This invention relates to potting and more particularly to a mechanism by means of which electrical components may be potted under vacuum conditions.

It is common practice in the manufacture of electrical and electronics equipment to completely embed an electrical component in a body of synthetic resin to provide it with superior moisture, impact, chemical and electrical resistance. Frequently, this is accomplished by filling the space between the electrical component and the housing in which it is carried by a solid body of suitable resin such as an epoxy resin in what is generally known in the industry as a potting operation. Since most resins commonly used for potting purposes involve an evolution of gas during the mixing and casting thereof and because air may be normally entrapped in the resin ingredients due to absorption and the mixing and casting operations, it is highly desirable to cast and mix the resins under vacuum conditions so as to draw off the gaseous products and permit the casting of void-free synthetic resin bodies.

It is accordingly the basic object of this invention to provide apparatus for mixing the resin system and thereafter casting it in place in a mold or between the electrical component and its housing under vacuum conditions.

This and other objects are accomplished in accordance with the present invention by providing a mechanism contained within a vacuum bell or hood which includes a resin mixing cup having an opening in the base thereof and a generally conical ramp-like device disposed below the mixing cup which is operative to serve as a closure for the opening at the base of the resin cup and as a ramp or trough for conveying the resin to a plurality of molds disposed below the ramp-like device.

The apparatus of the present invention involves a small number of parts of a very simple and trouble-free character which may be efficiently operated by control from without the vacuum bell to effectively pot electrical components under vacuum conditions.

Further objects and advantages of this invention will be apparent from the following description, reference being had to the accompanying drawings wherein a preferred embodiment of the invention is clearly shown.

Figure 1:
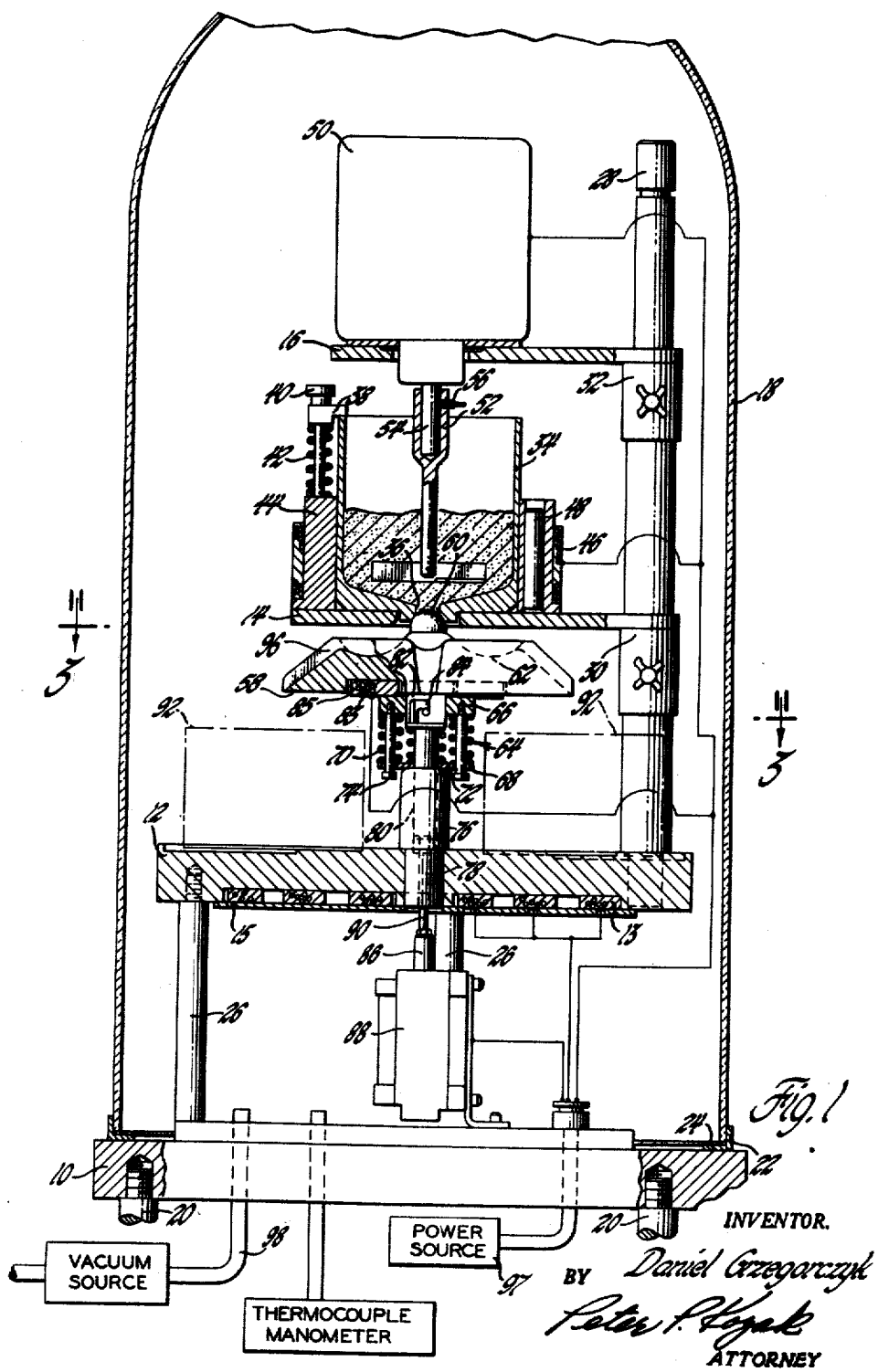
Figure 2:
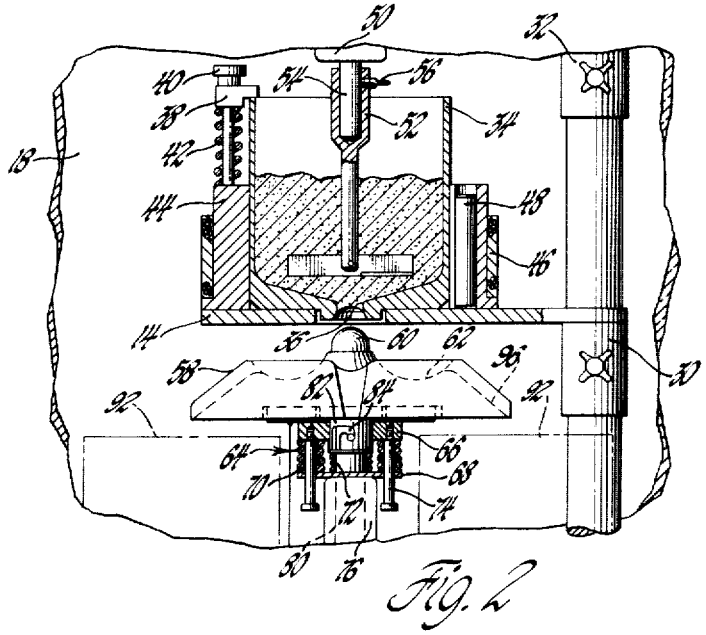
Figure 3:
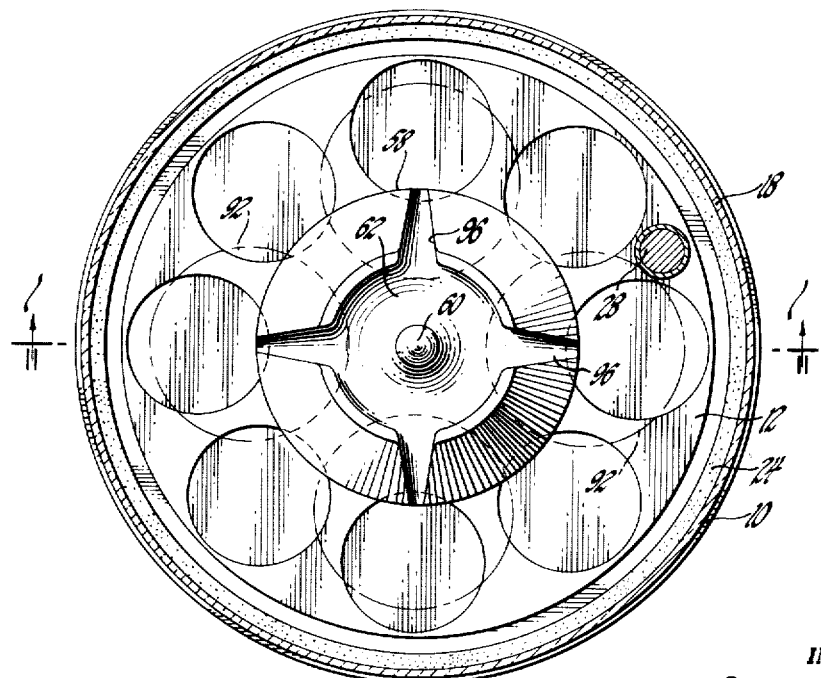

In the drawings:
FIGURE 1 is a cross-sectional elevation view of vacuum potting apparatus;
FIGURE 2 is a fragmentary view showing the resin cup and valve mechanism of FIGURE 1 in a valve open position; and
FIGURE 3 is a cross-sectional view taken along line 3—3 of FIGURE 1 showing the valve and ramp mechanism in relation to a plurality of molds disposed therebelow.

Referring to FIGURE 1, the apparatus includes a four level support structure including a base level 10 which supports a second level 12 and a vacuum tight glass bell or hood 18. The second level 12 supports the third level 14 and the fourth level 16 within the vacuum bell 18. The lowest level 10 is preferably a metal plate supported by a plurality of legs 20. Welded or otherwise fastened thereto in air tight relation is an annular flanged ring 22 and a gasket 24 which support the glass bell 18 in gas tight relation. The second level 12 in the form of a metal plate is supported on the first level 10 by means of a plurality of legs 26. A plurality of electrical resistance heating elements 13 are mounted in a recess in the base of the level 12 and are held therein by means of the retaining plate 15. Mounted on the second level 12 is a pillar 28 on which are mounted the third and fourth levels 14 and 16 supported by the adjustable collars 30 and 32, respectively.

Mounted on the level 14 is the resin cup 34 having an opening 36 in the base thereof. The resin cup 34 is held securely onto the level 14 by means of a clamp 38 held by a bolt 40 against a compression coil spring 42 associated with an annular retaining ring 44 screwed to the level 14. An electrical resistance heating element 46 is disposed about the retaining ring 44 for the purpose of heating the resin cup which is controlled by a cartridge-type thermostatic switch 48 which opens the electrical circuit to the heating element in response to rising temperatures.

A mechanism for agitating the resin within the resin cup 34 is provided which includes an electric motor 50 supported on the level 16 and having a depending mixing vane 52 fastened to the shaft 54 of the motor by a set screw 56.

The apparatus further includes a valve and conveyor device 58 which is called a "ramp" herein for convenience and simplicity. The ramp 58 is generally conical in shape and includes a centrally disposed and elevated partially spherical plug portion 60 and a generally conical base portion consisting of a plurality of ramps extending from the dip 62 to the lower edge of the base portion. The character of the ramp 58 will be discussed in greater detail hereinafter in connection with FIGURE 3.

As shown in FIGURE 1, the ramp 58 is supported by and normally biased upwardly by the spring assembly 64 whereby the opening 36 in the base of the resin cup 34 is normally closed by the partially spherical plug 60. The spring assembly 64 consists of upper and lower plates 66 and 68, respectively, held apart by a plurality of peripheral compression coil springs 70 and the central coil spring 72 and held together in assembled relation by the bolts 74. The lower plate 68 rests on the tubular support 76 which has a reduced diameter portion 78 fitted into an opening in the support 12 so that the offset portion of the tubular support 76 is supported by the support 12. Within the tubular member 76 there is provided a piston 80, the upper end of which is attached to a collar portion 82 of the ramp 58 extending through the upper plate 66 by a pin and bayonet slot arrangement 84. The piston 80 is connected at its lower end to a plunger 86 of a solenoid 88 by means of the connecting rod 90. It will, of course, be apparent that when the solenoid 88 is energized, the solenoid plunger 86 is pulled downwardly into the solenoid as the consequence of which the piston 80 is pulled downward carrying with it the ramp 58 against the springs 70 and 72 whereby the valve plug 60 is drawn from the opening 36 of the resin cup as shown in FIGURE 2.

As may be seen in relation to FIGURES 2 and 3, a plurality of molds 92 or electrical devices to be potted are disposed below and about the circumference of the ramp 58. The ramp consists of the central raised partially spherical plug portion 60, an annular dip or concave portion 62 and a plurality of downwardly extending trough portions 96. As shown in FIGURE 2 the opening 36 preferably has a valve seat of conical or partially spherical configuration adapted to receive the plug 60 in efficient sealing relation. It is readily apparent from an examination of FIGURE 2 that as the ramp 58 is depressed downwardly as above described, the opening 36 in the resin cup is opened with the result that the resin, a relatively viscous liquid material, slowly pours onto the spherical plug 60 which spreads the resin into an even radial layer flowing downwardly into the dip portion 62. After this dip is filled with the resin, forming a sort of reservoir, the resin flows down the troughs 96 into the molds 92. This arrangement insures that the flow rate of resin down each of the troughs 96 is substantially the same so that each of the mold elements 92 may be filled at substantially the same time. The base of the ramp 58 is provided with an annular electrical resistance heating element 83 clamped between the ramp 58 and the plate 66 within the annular groove 85 for the purpose of heating the ramp.

As indicated in FIGURE 1, the solenoid 88, the heating elements 13 of the level 12, the heating element 83 of the ramp 58, the heating element 46 surrounding the resin cup and the electric motor 50 are all connected to a power supply 97. Suitable means is provided whereby the motor 50 and solenoid 88 may be actuated independently from without the vacuum bell.

The operation of the apparatus of this invention will now be described in terms of filling the molds 92 with an epoxy resin potting composition. A suitable casting resin for this purpose may consist of 100 parts by weight of an epoxy resin, 50 parts by weight of a calcium carbonate filler, 80 parts by weight of hexahydrophthalic anhydride and 1 part by weight of benzyldimethylamine. The operation of the apparatus is as follows. The resin cup 34 is first substantially filled with the above resin components after which the vacuum bell 18 is placed in position and the system subjected to a vacuum through the conduit 98 to preferably about 100 to 200 microns of mercury. Meanwhile the resin cup 34 is heated to about 200° F. as determined by the thermostatic switch 48. The ramp 58 and the support 12 are likewise heated to about 200° F. and maintained at this temperature. The resin system is then thoroughly mixed by operating the mixing vanes 52 for a suitable period of time. After the mixing period, the solenoid 88 is actuated whereby the ramp 58 is drawn downwardly to release the resin from the resin cup 34 and permit it to pour onto the plug 60 of the ramp 58 as shown in FIGURE 2, into the depression or annular trough 62 and finally into the molds 92. The resin cup 34, the ramp 58 and the molds 92 are all heated to a temperature of about 200° F. to maintain the resin in a flowable condition and to accelerate its cure. It will be noted that each portion of the apparatus handling the resin is heated to prevent its cooling or flowing nonuniformly.

Although the invention has been described with specific reference to a particular embodiment, it is not to be regarded as so limited since changes and alterations therein may be made which are within the full intended scope of the invention as defined by the appended claims.

I claim:

1. Apparatus for casting resins under vacuum conditions comprising a vacuum chamber, a resin mixing cup within said chamber having an opening in the base thereof, a closure device disposed beneath said resin cup adapted for vertical movement between a raised and lowered position and a plurality of resin casting molds disposed beneath said device, said device having a centrally disposed plug adapted to close said opening when said device is in said raised position and to receive the flow of the resin from said cup when in said lowered position, said device including an annular depression about and below said plug and a plurality of downwardly sloping channels adapted to guide the resin from said depression to said molds at a uniform rate.

2. Apparatus for casting resins under vacuum conditions comprising a vacuum chamber, a resin mixing cup within said chamber having an opening in the base thereof, a closure device disposed beneath said resin cup adapted for vertical movement between a raised and lowered position and a plurality of resin casting molds disposed beneath said device, said device having a generally conical configuration including a partially spherical plug forming the vortex thereof adapted to close said opening when said device is in said raised position and to receive the flow of resin from said cup when in said lowered position, said device including an annular depression about and below said plug and a plurality of downwardly sloping channels extending from a point above the lowermost portion of said depression and extending to the edge of said device adapted to guide the resin from said depression to said molds at a uniform rate.

3. Apparatus for casting resins under vacuum conditions comprising a vacuum chamber, a resin mixing cup within said chamber having an opening in the base thereof, a closure device disposed beneath said resin cup adapted for vertical movement between a raised and lowered position and a plurality of resin casting molds disposed beneath said device, said device having a generally conical configuration including a partially spherical plug forming the vortex thereof adapted to close said opening when said device is in said raised position and to receive the flow of resin from said cup when in said lowered position, said device including an annular reservoir about and below said plug and a plurality of downwardly sloping channels extending from a point above the lowermost portion of said reservoir and extending to the edge of said device adapted to guide the resin from said depression to said molds at a uniform rate, compression spring means supporting and urging said device to said raised position, solenoid means operatively connected to said device for drawing it to said lowered position, and heating coils associated with said resin cup, said closure device and said molds.

4. Fluid distribution apparatus comprising a first container having an opening in the base thereof, a closure device disposed beneath said container adapted for vertical movement between a raised and lowered position and a plurality of second containers disposed beneath said first container, said device having a centrally disposed plug adapted to close said opening when said device is in said raised position and to receive the flow of the fluid from said first container when in said lowered position, said device including an annular depression disposed below said plug forming a reservoir, a plurality of downwardly sloping channels adapted to guide the fluid flowing from said reservoir to said second containers.

References Cited in the file of this patent

UNITED STATES PATENTS

| | | |
|---|---|---|
| Re. 18,202 | Polak | Sept. 22, 1931 |
| 702,573 | Marx | June 17, 1902 |
| 1,294,545 | Secord | Feb. 18, 1919 |
| 1,694,563 | Ross et al. | Dec. 11, 1928 |
| 2,165,671 | Ward | July 11, 1939 |
| 2,457,756 | Vest | Dec. 28, 1948 |
| 2,461,723 | Cowan | Feb. 15, 1949 |
| 2,477,273 | Tognola | July 26, 1949 |
| 2,832,368 | Freer | Apr. 29, 1958 |

FOREIGN PATENTS

| | | |
|---|---|---|
| 365,290 | Great Britain | Jan. 21, 1932 |

UNITED STATES PATENT OFFICE
CERTIFICATE OF CORRECTION

Patent No. 3,081,492                                March 19, 1963

Daniel E. Grzegorczyk

It is hereby certified that error appears in the above numbered patent requiring correction and that the said Letters Patent should read as corrected below.

Column 4, lines 6 and 24, for "vortex", each occurrence, read -- vertex --.

Signed and sealed this 12th day of November 1963.

(SEAL)
Attest:

ERNEST W. SWIDER                               EDWIN L. REYNOLDS

Attesting Officer                             Acting Commissioner of Patents